United States Patent [19]

Babineaux, III

[11] 4,447,330

[45] May 8, 1984

[54] METHOD OF TREATING WASTE WATER

[76] Inventor: David Babineaux, III, P.O. Box 103, Rayne, La. 70578

[21] Appl. No.: 476,400

[22] Filed: Mar. 23, 1983

Related U.S. Application Data

[63] Continuation of Ser. No. 280,059, Jun. 30, 1981, abandoned, which is a continuation of Ser. No. 94,755, Nov. 15, 1979, abandoned, which is a continuation of Ser. No. 15,416, Feb. 26, 1979, abandoned.

[51] Int. Cl.³ ............................ C02F 1/52; C02F 1/74
[52] U.S. Cl. .................................... 210/717; 166/267; 210/721; 210/726; 210/738; 210/747
[58] Field of Search .......................... 166/267; 175/66; 210/620, 631, 702, 708, 718, 721, 722, 717, 723–728, 738, 747, 750, 758

[56] References Cited

U.S. PATENT DOCUMENTS

| | | | |
|---|---|---|---|
| 2,217,143 | 10/1940 | Stevenson | 210/705 |
| 3,433,312 | 3/1969 | Burdyn et al. | 175/66 |
| 3,480,144 | 11/1969 | Barth et al. | 210/626 |
| 3,547,190 | 12/1970 | Wilkerson | 166/75 |
| 3,637,031 | 1/1972 | Hull et al. | 175/66 |
| 3,681,238 | 8/1972 | Emmett | 210/722 |
| 3,733,037 | 6/1973 | Bone | 210/734 |
| 3,772,188 | 11/1973 | Edwards | 210/629 |
| 4,035,289 | 7/1977 | Guillerme et al. | 210/620 |
| 4,127,482 | 11/1978 | Watson et al. | 175/66 |
| 4,234,421 | 11/1980 | Dover | 210/708 |

*Primary Examiner*—Peter A. Hruskoci
*Attorney, Agent, or Firm*—David L. Ray

[57] ABSTRACT

A method of purifying waste water from oil well rigs in order that the water may be made suitable for reuse on the rig or disposed of conventionally is disclosed. The method incorporates a series of aerators and corresponding collection tanks to first aerate, then collect, the waste water a number of times. In each collection tank, sediment precipitates to the bottom of the tank, permitting the clearer water to overflow, or to be skimmed, from the collection tank. A soluble aluminum salt is added to the waste water at an initial stage of aeration in order to coagulate waste particles within the water and form solid precipitates which then settle to the tank bottom, permitting the clearer water to pass on to subsequent aerators and sedimentation tanks, until ultimately, the water may be disposed of without polluting or contaminating the environment.

1 Claim, 1 Drawing Figure

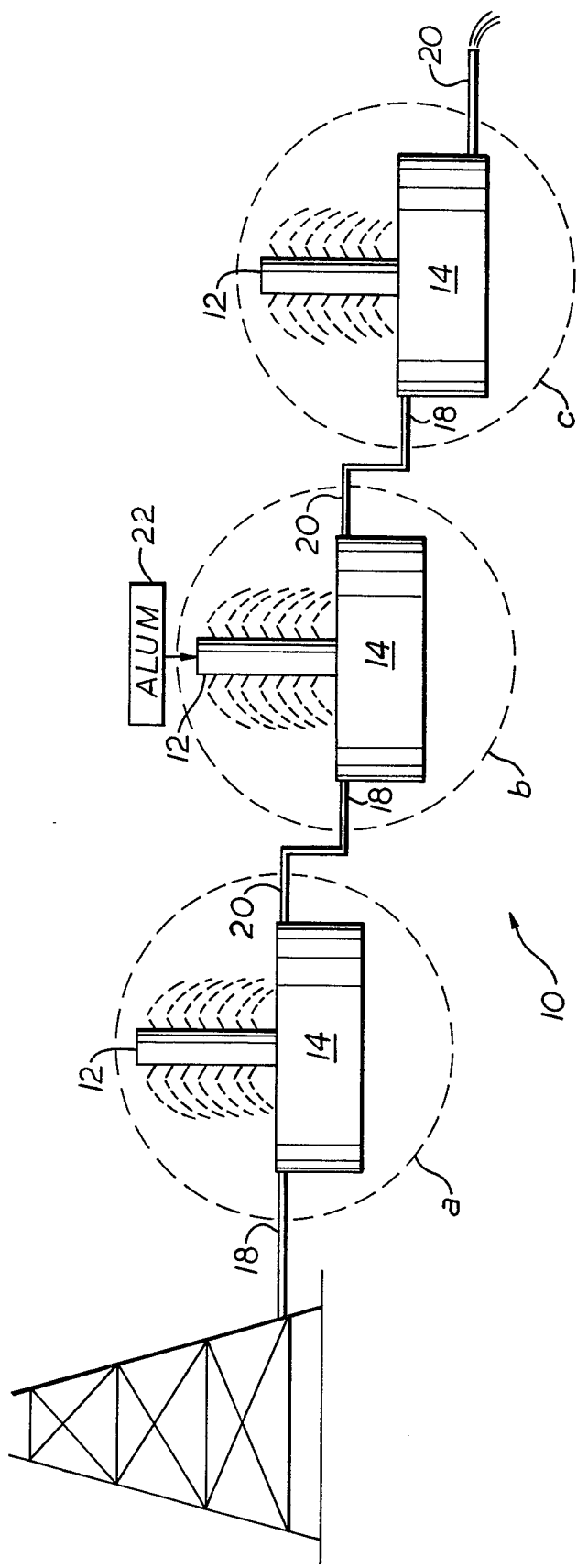

4,447,330

METHOD OF TREATING WASTE WATER

This application is a continuation of application Ser. No. 06/280,059, filed June 30, 1981 now abandoned which is a continuation of application Ser. No. 094,755 filed Nov. 15, 1979 now abandoned, which is a continuation of application Ser. No. 015,416 filed Feb. 26, 1979 now abandoned.

BACKGROUND OF THE INVENTION

This invention relates to a method of purifying and treating waste water of various types, primarily that used on oil well rigs and generally in the operation of drilling oil and gas wells.

In order to meet state water quality standards in treating waste water, several specific parameters must be met:

pH: 6.0–9.0;
Chlorides(Mg/L): 1000 or less;
Color (units): 5000;
Chemical Oxygen demand (COD) (Mg/L): 200 or less;
Total Suspended Solids(Mg/L): 50 or less;
Total Dissolved Solids(Mg/L): 3000 or less;
Oil and Grease(Mg/L): 15 or less.

Waste water meeting these parameters may be disposed of without polluting or contaminating the environment, or of course, may be recycled for use on the drilling rig. It has been found that the introduction of flocculents such as aluminum sulfate (Alum), MFI, Lime, 5C, and the modern technology polymers to the waste water will form flocculent precipitate which coagulates fine solid impurities therein and permits them to settle to the bottom of the tank or pit while the clean, clear water is skimmed from the top or permitted to overflow into a subsequent sedimentation tank or pit.

Patents considered pertinent to the present invention include Newman, U.S. Pat. No. 1,418,013, disclosing an improvement in water purification by treating same with an alkaline bleaching agent and an coagulant; Langelier, U.S. Pat. No. 1,465,173, disclosing a water purification method involving treatment using a minimum dosage of coagulant in combination with an acid to yield ionic hydrogen and improved coagulation; Mallory, U.S. Pat. No. 2,138,349, disclosing a method and apparatus for aerating sewage using a series of internal rotating diffusing baffels; Riddick, U.S. Pat. No. 3,075,645, disclosing a water treatment system, whereby coagulant is added to the water, the mixture is aerated and then passed through a flocculation basin, then filtered; Horiguchi et al, U.S. Pat. No. 3,547,816, disclosing an aeration and filtering water purification system; Edwards, U.S. Pat. No. 3,772,188, disclosing a waste water treatment system using pressurized oxygen injection; Pradt, U.S. Pat. No. 3,876,536, disclosing a high temperature and high pressure wet air oxidation process for treating waste water; and Reimann, U.S. Pat. No. 4,029,574, disclosing a process for aerating organically contaminated sewage with oxygen.

SUMMARY OF THE INVENTION

The present invention incorporates a series of aerators and corresponding collection tanks in order that waste water may be first aerated, then collected, through a number of aeration devices a number of times. At some point, or points, in this series of aeration steps, a soluble aluminum salt (alum) or other selected flocculent is introduced into the water flow channel so that it mixes with the water and is aerated and agitated therewith. This mixing and coagulation of the waste particles within the water forms solid precipitates which then settle to the tank bottom, leaving clear water for disposition or for re-use on the drilling site.

BRIEF DESCRIPTION OF THE DRAWING

The features and advantages of this invention will become more apparent to those skilled in the art from the following detailed description of the invention, together with the drawing in which:

FIG. 1 is a schematic diagram of a series of aerating devices and sedimentation tanks, including the location of the introduction of alum thereto.

DETAILED DESCRIPTION OF THE INVENTION

Referring now to the drawing, the water purification system is shown, generally illustrated at 10. It comprises a series of spray aerators and sedimentation tanks, noted on the drawing by sequential reference designators a,b,c, etc., in the direction of flow of the waste water. Each aerator and tank combination comprises a spray aerator 12, a water collecting tank 14, a tank input 18 and a tank exhaust pipe 20.

The spray aerators 12 are shown in the drawing to stand upright within the tank 14 and spray water radially therefrom into the atmosphere within the open collecting tank. These aerators 12 may, however, be of any conventional type without affecting the spirit of the present invention. The spray aerators 12 are positioned within and/or above the water collecting tank 14 in any manner suitable to permit effective aeration of the waste water and collection thereof within the respective water collecting tank 14.

As shown in the drawing, means are provided at 22 for adding alum to the waste water at the second "b" section aerator. It has been found that alum or other soluble aluminum salt or flocculent added to the waste water in the initial stages of purification and aeration reacts with other minerals in the water to form a flocculent precipitate, which aids in coagulating the foreign matter and other impurities within the waste water so that they may precipitate out as the waste water passes through the sequential sedimentation tanks 14 via the tank discharge pipe 20 leading into the subsequent aerator feed pipe 18.

In operation, waste water enters the water purification system 10 at the initial aerator feed pipe 18 of the first "a" section. Pumps (not shown) may be used at this point to pressurize the water system to make the spray aerators 12 more effective. In an open system, as that shown in the drawing, the waste water is aerated into the atmosphere and permitted to collect in the water collection tank 14. In this first tank, solid foreign matter particles are precipitated out and the remaining water exits the tank 14 through the initial tank discharge pipe 20 and into the subsequent aerator feed pipe 18 of the second "b" section.

At this point, alum is added to the waste water through the alum addition inlet 22 immediately ahead of the spray aerator 12. As explained hereinabove, this introduction of alum aids in coagulating the impurities and foreign matter contained in the waste water so that they may settle out as the water passes through the various sedimentation tanks.

The preferred embodiment is illustrated and described as being a series of open air pits or tanks, each having at least one vertical spray aerator therein. The tanks are stepped sequentially so that clear water is skimmed from the top of one tank and fed into each subsequent tank for further purification. Numerous variations in this particular design may be employed without detracting from the spirit of the invention. Typically, the tanks may be enclosed and pressurized with air or oxygen, and/or horizontal aeration devices may be employed in either open-air or inclosed tanks. These alternative suggestions are merely exemplary and are, by no means, intended to limit the invention to the enumerated alternatives.

In order to more fully appreciate the present invention, the following examples are supplied and, as examples, are to be construed merely as illustrative, and in no way construed to limit the invention to those examples.

EXAMPLE I

A sample of oil well waste water was cycled through a series of three aerators at a rate of approximately 200 gallons per minute (gpm). Alum was added to the water ahead of the pump of the second aerator at a rate of 1½ pounds per minute. Samples of water were collected before and after treatment and analysis to yield the following:

| Criteria | Before | After |
| --- | --- | --- |
| pH (adjusted to pH. to 7.0) | 7.8 | 4.6 |
| Chlorides (Mg/L) | 886 | 532 |
| Color (units) | 20,000 | 75 |
| Chemical Oxygen Demand (Mg/L) | 425 | 165 |
| Total Suspended Solids (Mg/L) | 760 | 17 |
| Total Dissolved Solids (Mg/L) | 2600 | 1800 |
| Oil or Grease (Mg/L) | 21 | <1 |

EXAMPLE II

A sample of oil well waste water was cycled through a series of three aerators at a rate of approximately 200 gallons per minute (gpm). Alum was added to the water ahead of the pump of the second aerator at a rate of 3½ pounds per minute. Samples of water were collected before and after treatment and analysis to yield the following:

| Criteria | Before | After |
| --- | --- | --- |
| pH (adjusted to pH. to 7.0) | 8.9 | 6.9 |
| Chemical Oxygen Demand (Mg/L) | 1170 | 182 |
| Total Suspended Solids (Mg/L) | 2840 | 58 |

Thus, it is apparent that there has been provided in accordance with the invention, a method of and apparatus for treating waste water that fully satisfies the objects, aims, and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications, and variations as fall within the spirit and scope of the appended claims.

The invention having been described, what is claimed is:

1. A method of purifying and treating waste water used in drilling oil and gas wells, said waste water containing impurities comprising chlorides, suspended solids, dissolved solids, and oil or grease consisting essentially of the steps of providing a plurality of serially connected sedimentation tanks with each tank having an aerator feed pipe, at least one spray aerator positioned in and above the tank, and a tank discharge pipe, introducing waste water into an initial aerator feed pipe of one of said sedimentation tanks, spraying said waste water from each aerator feed pipe with the aerator into the atmosphere and back into the tank in order to aerate the waste water and permit the aerated waste water to recollect in the tank, skimming clear waste water from the top of each sedimentation tank into said tank discharge pipe and feeding said clear waste water into the aerator feed pipe of a subsequent one of said serially connected sedimentation tanks introducing an effective amount of a flocculent into the waste water ahead of the aerator in at least one of said sedimentation tanks so that said flocculent is mixed, aerated, and agitated along with the waste water, said flocculent reacting with minerals contained in said waste water to form a flocculent precipitate which aids in coagulating said impurities, settling said impurities as the waste water passes sequentially from one sedimentation tank to another of said tanks, and discharging clean water directly from one of said sedimentation tanks for disposal or reuse.

* * * * *